US012153698B2

(12) United States Patent
Carru et al.

(10) Patent No.: US 12,153,698 B2
(45) Date of Patent: *Nov. 26, 2024

(54) SECURE SHARED DATA APPLICATION ACCESS

(71) Applicant: Snowflake Inc., Bozeman, MT (US)

(72) Inventors: Damien Carru, Rhinebeck, NY (US); Jeremy Yujui Chen, Newark, CA (US); Mohamad Raja Gani Mohamad Abdul, Fremont, CA (US); William A. Pugh, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,275

(22) Filed: Jan. 31, 2023

(65) Prior Publication Data

US 2023/0409724 A1    Dec. 21, 2023

Related U.S. Application Data

(63) Continuation of application No. 18/060,476, filed on Nov. 30, 2022.

(Continued)

(51) Int. Cl.
    *G06F 21/62* (2013.01)
(52) U.S. Cl.
    CPC ........ *G06F 21/6218* (2013.01); *G06F 21/629* (2013.01)
(58) Field of Classification Search
    CPC .................... G06F 21/6218; G06F 21/629
    See application file for complete search history.

(56) References Cited

U.S. PATENT DOCUMENTS 7,555,497 B2    6/2009  Thompson et al.
7,698,398 B1 *  4/2010  Lai .................... G06Q 30/00
                                                    709/228

(Continued)

FOREIGN PATENT DOCUMENTS

CN      117235339 A    12/2023
DE    202023103216 U1    9/2023
JP      2005284353 A    10/2005

OTHER PUBLICATIONS

"U.S. Appl. No. 18/053,956, Notice of Allowance mailed Mar. 3, 2023", 9 pgs.

(Continued)

*Primary Examiner* — Jason Chiang
(74) *Attorney, Agent, or Firm* — Schwegman Lundberg & Woessner, P.A.

(57) ABSTRACT

A data platform for developing and deploying a data application. The data platform receives from a first user the data application and provider granted privileges including a consumer usage privilege and a consumer access to data privilege. The data platform authorizes the second user to access the data platform based on one or more consumer account privileges included in a set of account privileges. The data platform authorizes the second user to execute the data application based on the consumer usage privilege. During execution, the data platform authorizes the data application to access the provider database object based on the consumer access to data privilege, and authorizes the data application to access the consumer database object based on a provider access to data privilege provided by the second user.

30 Claims, 6 Drawing Sheets

Related U.S. Application Data

(60) Provisional application No. 63/366,280, filed on Jun. 13, 2022.

(56) References Cited

U.S. PATENT DOCUMENTS

| | | | | |
|---|---|---|---|---|
| 7,921,299 | B1* | 4/2011 | Anantha | H04N 21/25875 |
| | | | | 726/28 |
| 9,460,474 | B2* | 10/2016 | Grignon | G06Q 10/06 |
| 9,712,542 | B1* | 7/2017 | Brandwine | H04L 67/10 |
| 9,774,586 | B1* | 9/2017 | Roche | H04L 63/08 |
| 11,055,390 | B1* | 7/2021 | Kragh | H04W 12/08 |
| 11,093,634 | B1* | 8/2021 | Szuflita | G06F 21/604 |
| 11,093,912 | B1* | 8/2021 | Fakhraie | G06F 9/451 |
| 11,146,564 | B1* | 10/2021 | Ankam | H04L 63/102 |
| 11,256,606 | B2* | 2/2022 | Wunderlich | G06F 11/3664 |
| 11,461,080 | B1 | 10/2022 | Brossard et al. | |
| 11,461,322 | B1* | 10/2022 | Plenderleith | G06F 16/2456 |
| 11,494,493 | B1* | 11/2022 | Baird | H04L 9/0894 |
| 11,520,920 | B1* | 12/2022 | Carru | G06F 16/213 |
| 11,552,948 | B1* | 1/2023 | Peterson | H04L 63/0876 |
| 11,775,669 | B1 | 10/2023 | Carru et al. | |
| 11,823,164 | B1* | 11/2023 | Goetz | G06Q 50/40 |
| 12,010,147 | B2 | 6/2024 | Chen et al. | |
| 2004/0054630 | A1* | 3/2004 | Ginter | H04N 21/6581 |
| | | | | 375/E7.009 |
| 2006/0080257 | A1* | 4/2006 | Vaughan | G06Q 10/10 |
| | | | | 705/51 |
| 2007/0157203 | A1 | 7/2007 | Lim | |
| 2008/0184330 | A1 | 7/2008 | Lal et al. | |
| 2010/0299738 | A1* | 11/2010 | Wahl | G06F 21/33 |
| | | | | 713/170 |
| 2011/0265010 | A1 | 10/2011 | Ferguson et al. | |
| 2012/0096521 | A1* | 4/2012 | Peddada | H04L 41/28 |
| | | | | 726/4 |
| 2014/0173702 | A1* | 6/2014 | Wong | H04L 63/0281 |
| | | | | 726/4 |
| 2016/0070449 | A1* | 3/2016 | Christiansen | G06F 16/9535 |
| | | | | 715/765 |
| 2016/0104005 | A1* | 4/2016 | Toussaint | G06F 21/6218 |
| | | | | 707/783 |
| 2016/0255089 | A1* | 9/2016 | Diestler | G06F 21/6236 |
| | | | | 726/4 |
| 2016/0321412 | A1* | 11/2016 | Basri | G16H 15/00 |
| 2017/0249475 | A1* | 8/2017 | Schneider | G06F 21/6218 |
| 2017/0308377 | A1* | 10/2017 | Tucker | G06F 9/44505 |
| 2017/0322992 | A1* | 11/2017 | Joseph | G06F 16/27 |
| 2018/0007155 | A1* | 1/2018 | Saito | H04N 21/25808 |
| 2019/0238467 | A1* | 8/2019 | Guan | H04L 63/0227 |
| 2019/0318100 | A1* | 10/2019 | Bhatia | G06F 21/57 |
| 2019/0372783 | A1 | 12/2019 | Martinez et al. | |
| 2020/0380153 | A1* | 12/2020 | Mi | H04L 63/126 |
| 2021/0166573 | A1* | 6/2021 | Douglas | G09B 7/06 |
| 2021/0173701 | A1* | 6/2021 | Cheng | G06F 9/4881 |
| 2021/0342196 | A1* | 11/2021 | Natarajan | H04L 41/0895 |
| 2022/0272117 | A1* | 8/2022 | Maheve | H04L 63/1416 |
| 2022/0345483 | A1* | 10/2022 | Shua | H04L 9/0825 |
| 2022/0358233 | A1* | 11/2022 | Thakur | G06F 9/54 |
| 2022/0407889 | A1* | 12/2022 | Narigapalli | H04L 63/101 |
| 2023/0164189 | A1* | 5/2023 | Danilchenko | H04L 63/102 |
| | | | | 726/1 |
| 2023/0403306 | A1 | 12/2023 | Chen et al. | |
| 2024/0163316 | A1 | 5/2024 | Chen et al. | |

OTHER PUBLICATIONS

"U.S. Appl. No. 18/053,956, Notice of Allowance mailed Jul. 6, 2023", 10 pgs.

"U.S. Appl. No. 18/053,956, Supplemental Notice of Allowability mailed Mar. 29, 2023", 2 pgs.

"U.S. Appl. No. 18/060,476, Corrected Notice of Allowability mailed Jul. 27, 2023", 2 pgs.

"U.S. Appl. No. 18/060,476, Non Final Office Action mailed Feb. 28, 2023", 21 pgs.

"U.S. Appl. No. 18/060,476, Notice of Allowance mailed Jul. 7, 2023", 19 pgs.

"U.S. Appl. No. 18/060,476, Response filed May 30, 23 to Non Final Office Action mailed Feb. 28, 2023", 15 pgs.

"U.S. Appl. No. 18/053,956, Notice of Allowance mailed Sep. 14, 2023", 9 pgs.

"U.S. Appl. No. 18/053,956, Notice of Allowance mailed Nov. 29, 2023", 9 pgs.

"European Application Serial No. 23178797.9, Extended European Search Report mailed Oct. 31, 2023", 9 pgs.

"European Application Serial No. 23178797.9, Response filed Jun. 20, 2024 to Extended European Search Report mailed Oct. 31, 2023", 10 pgs.

\* cited by examiner

SECURE SHARED DATA APPLICATION ACCESS

PRIORITY CLAIM

This application is a continuation of U.S. patent application Ser. No. 18/060,476, filed on Nov. 30, 2022, and claims the benefit of priority to U.S. Provisional Patent Application Ser. No. 63/366,280, filed Jun. 13, 2022, the contents of these applications are hereby incorporated by reference in their entireties.

TECHNICAL FIELD

Examples of the disclosure relate generally to databases and, more specifically, to security of shared applications.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

Producers and consumers of data on a data platform may desire a way to conveniently share applications.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
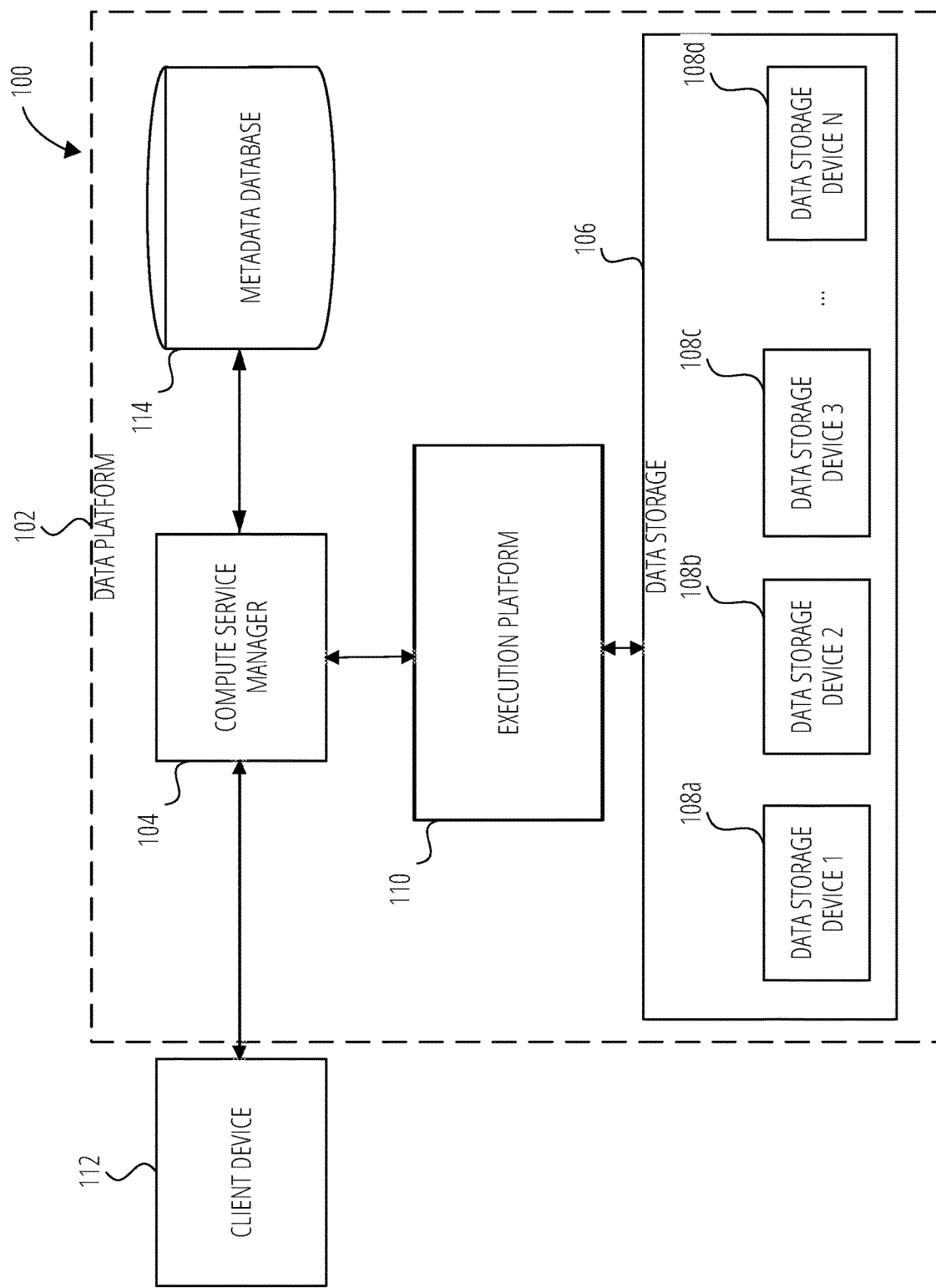
FIG. 1 illustrates an example computing environment that includes a network-based data platform in communication with a cloud storage provider system, in accordance with some examples of the present disclosure.

A data application provided by a provider of data in a data application marketplace sometimes worked in a security context of a consumer of data who bought the data application. The consumer may acquire privileges to access the application and the data application may be granted privileges to access (read/write) data associated with the consumer by a user account of the data platform.

In some solutions, data applications may only operate in a context of one account from which the data application is accessed. So, it may be problematic for the provider sharing the data application with other accounts to let the data application use the data available in the provider account. For the data application to access the provider's data, it is copied over to the consumer account for the data application to use the data for its functionality which exposes the data to users in the consumer account and not just to the shared application.

In some examples, providers share both the function that the data application executes and the provider's data for the shared data application's usage but not to the users in the consumer's account. This protects the provider's algorithm implemented as a function in the data application and the valuable data of the provider. The data application is shared with other accounts so that the shared data application account can glean valuable information derived from the provider's data and apply the functionality in the context of consumer's data.

In some examples, as part of bundling a data application as a data platform native application, the data application is granted privileges to access data in the provider's account. Similarly, the data application gains access to the consumer's data when the native application is imported into the consumer's account.

In some examples, a data platform provides for data applications to be shared in a marketplace to securely connect to data platform accounts of the provider and the consumer by the data platform authorizing users across these accounts in their respective contexts to use data (when granted) from the provider account (from which the application is shared) and read/write data on consumer accounts (to which the application is shared) for the data application functionality thus providing a sandbox for each account without transferring/copying data across accounts. To do so, the data platform establishes a correct user context in each data platform account accessing the data application combined with the privileges granted to the application to access data in each of the accounts to which this application is shared. This is achieved by creating the data application as a first-class database entity to which users and roles can be granted access to use the data application. Furthermore, data application is packaged as part of a data platform native application framework so that the data application can have access to data on the provider account. Similarly, when the native application is imported as a share in a consumer account, the administrator of the consumer account can grant data access to the data application for the data application to access data from the consumer account. A "share" is a portion of a provider database shared by the provider with the consumer and deployed to an account of the consumer.

In some examples, a data platform receives from a first user a data application to be executed on the data platform and a set of provider granted privileges for the data application, the provider granted privileges include a consumer usage privilege authorizing a second user to use the data application and a consumer access to data privilege authorizing the second user to access a provider database object of the first user. The data platform authorizes the second user to access the data platform based on a consumer account privilege. The data platform receives from the second user a set of consumer granted privileges, where the consumer granted privileges include a provider access to data privilege authorizing the first user to access a consumer database object of the second user. The data platform authorizes the second user to use the data application based on the consumer usage privilege of the provider granted privileges. During an execution of the data application by the data platform in response to a request from the second user to use the data application, the data platform authorizes the data application to access the provider database object based on the consumer access to data privilege included in the provider granted privileges and authorizes the data application to access a consumer database object based on a provider access to data privilege included in the consumer granted privileges.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client device 112, in accordance with some examples of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage 106, a compute service manager 104, an execution platform 110, and a metadata database 114. The data storage 106 comprises a plurality of computing machines and provides on-demand computer system resources such as data storage and computing power to the data platform 102. As shown, the data storage 106 comprises multiple data storage devices, namely data storage device 1 108a, data storage device 2 108b, and data storage device 3 108c to data storage device N 108d. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the data storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the data storage 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage 106. Moreover, the data platform 102 may maintain metadata associated with the consumer accounts in the metadata database 114. Each consumer account includes multiple data objects with examples including users, roles, privileges, a datastores or other data locations (herein termed a "stage" or "stages"), and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple consumer accounts supported by the data platform 102 to interact with and utilize the functionality of the data platform 102. In some examples, the compute service manager 104 does not receive any direct communications from the client device 112 and only receives communications concerning jobs from a queue within the data platform 102.

The compute service manager 104 is also coupled to metadata database 114. The metadata database 114 stores data pertaining to various functions and aspects associated with the data platform 102 and its users. In some examples, the metadata database 114 includes a summary of data stored in remote data storage systems as well as data available from a local cache. Additionally, the metadata database 114 may include information regarding how data is organized in remote data storage systems (e.g., the database storage 106) and the local caches. The metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 1 108a to data storage device N 108d are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and data storage 106 are shown in FIG. 1 as individual discrete components. However, each of the compute service manager 104, metadata database 114, execution platform 110, and data storage 106 may be implemented as a distributed system (e.g., distributed across multiple systems/platforms at multiple geographic locations). Additionally, each of the compute service manager 104, metadata database 114, execution platform 110, and data storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage 106. It is desirable to retrieve as much data as possible from caches within the execution platform 110 because the retrieval speed is typically faster than retrieving data from the data storage 106.

As shown in FIG. 1, the computing environment 100 separates the execution platform 110 from the data storage 106. In this arrangement, the processing resources and cache resources in the execution platform 110 operate independently of the database storage devices data storage device 1 108a to data storage device N 108d in the data storage 106. Thus, the computing resources and cache resources are not restricted to a specific one of the data storage device 1 108a to data storage device N 108d. Instead, all computing resources and all cache resources may retrieve data from, and store data to, any of the data storage resources in the data storage 106.

Figure 2:
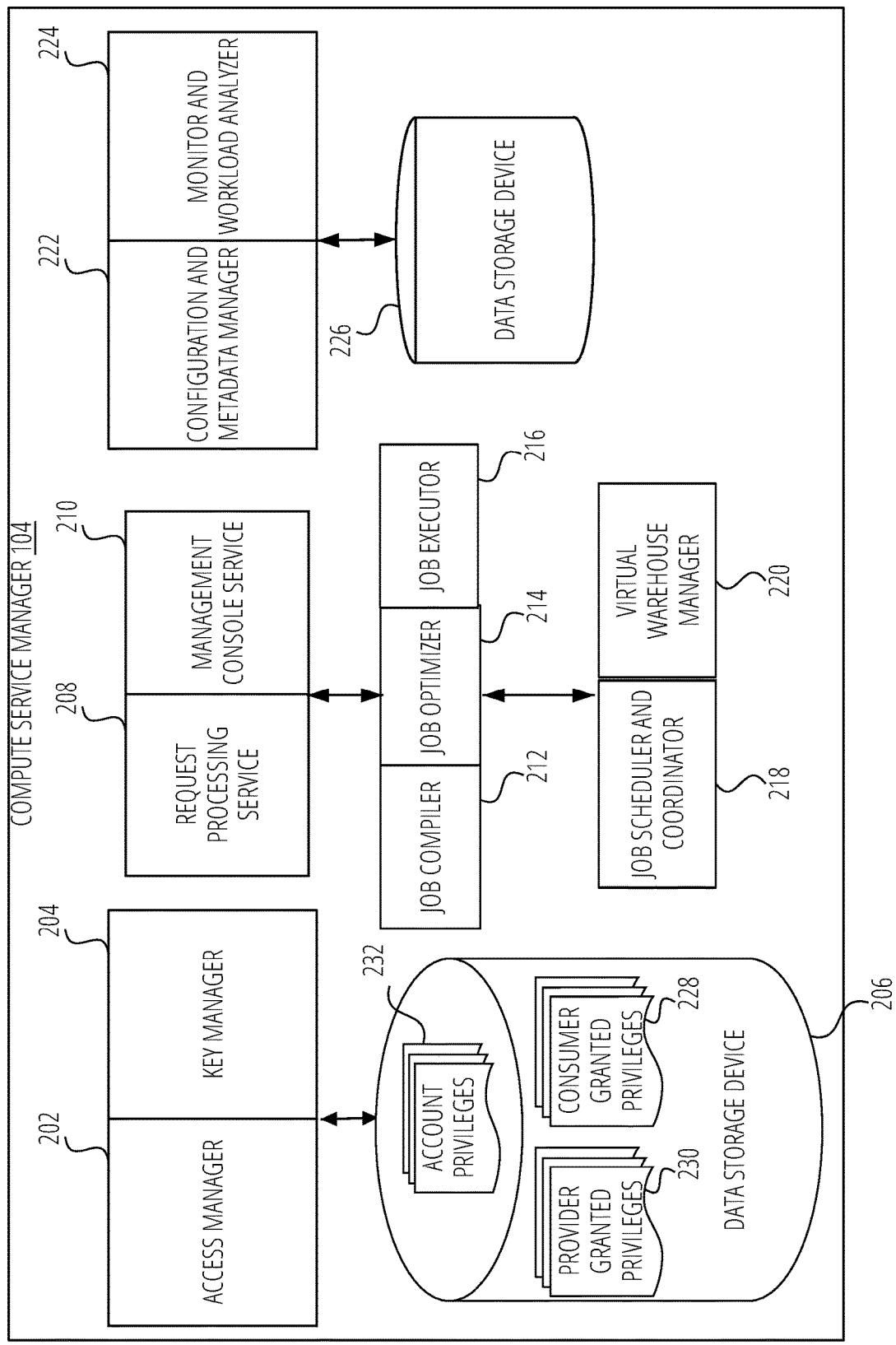
FIG. 2 is a block diagram illustrating components of a compute service manager, in accordance with some examples of the present disclosure.

FIG. 2 is a block diagram illustrating components of the compute service manager 104, in accordance with some examples of the present disclosure. As shown in FIG. 2, the compute service manager 104 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 106). As used herein, the remote storage devices may also be referred to as "persistent storage devices" or "shared storage devices."

In some examples, the access manager 202 authorizes access to database objects of the data platform 102 based on one or more sets of access privileges stored on the data storage device 206, such as a set of account privileges 232, a set of provider granted privileges 230, and a set of consumer granted privileges 228.

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage 106, or any other storage device.

The compute service manager 104 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 1 304a) may need to communicate with another execution node (e.g., execution node 2 304b), and should be disallowed from communicating with a third execution node (e.g., execution node 1 316a) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
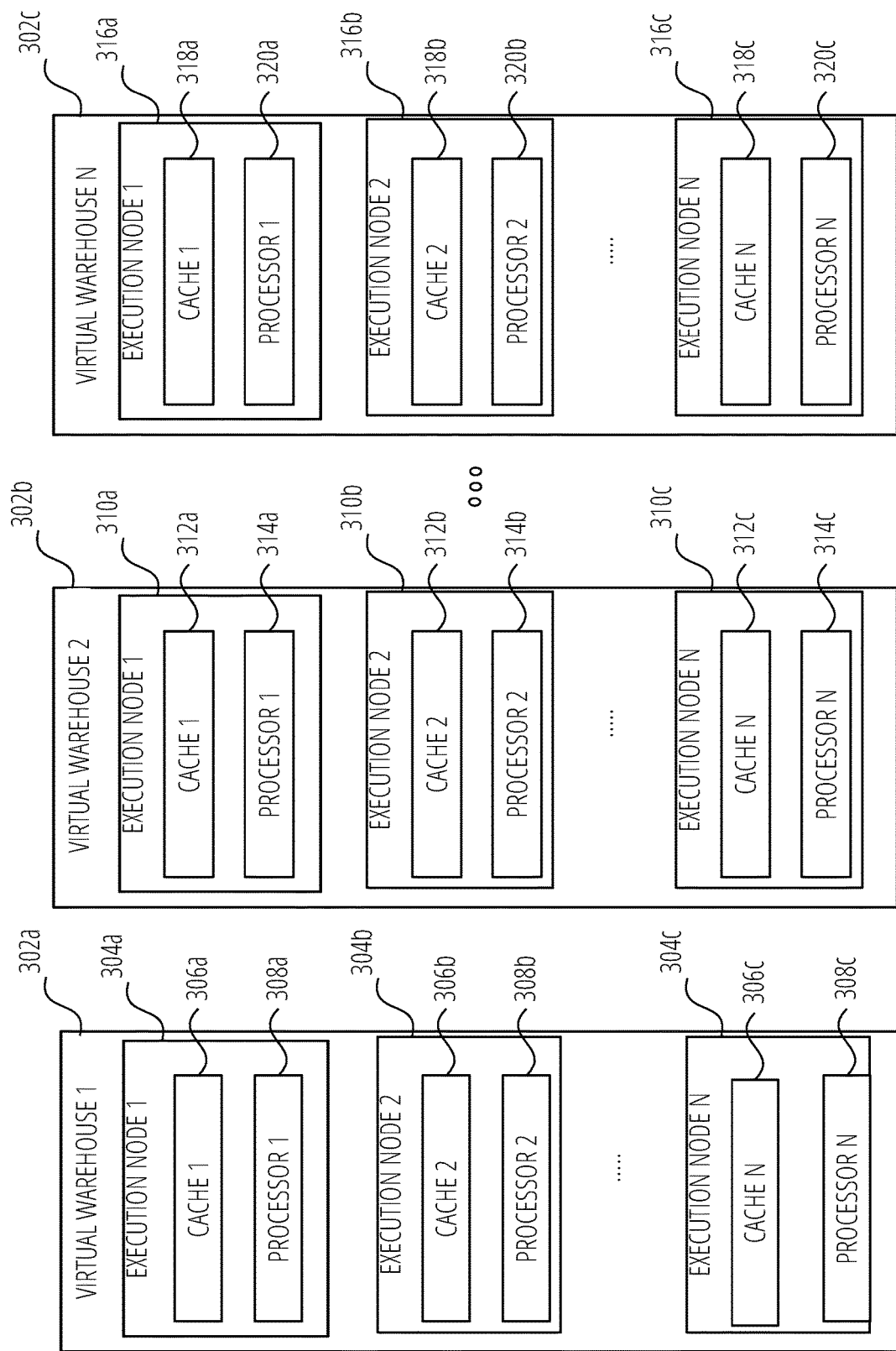
FIG. 3 is a block diagram illustrating components of an execution platform, in accordance with some examples of the present disclosure.

FIG. 3 is a block diagram illustrating components of the execution platform 110, in accordance with some examples of the present disclosure. As shown in FIG. 3, the execution platform 110 includes multiple virtual warehouses, including virtual warehouse 1 302a, and virtual warehouse 2 302b to virtual warehouse N 302c. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in data storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the data storage 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 1 302a includes a plurality of execution nodes as exemplified by execution node 1 304a, execution node 2 304b, and execution node N 304c. Execution node 1 304a includes cache 1 306a and a processor 1 308a. Execution node 2 304b includes cache 2 306b and processor 2 308b. Execution node N 304c includes cache N 306c and processor N 308c. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302a discussed above, virtual warehouse 2 302b includes a plurality of execution nodes as exemplified by execution node 1 310a, execution node 2 310b, and execution node N 310c. Execution node 1 304a includes cache 1 312a and processor 1 314a. Execution node 2 310b includes cache 2 312b and processor 2 314b. Execution node N 310c includes cache N 312c and processor N 314c. Additionally, virtual warehouse N 302c includes a plurality of execution nodes as exemplified by execution node 1 316a, execution node 2 316b, and execution node N 316c. Execution node 1 316a includes cache 1 318a and processor 1 320a. Execution node 2 316b includes cache 2 318b and processor 2 320b. Execution node N 316c includes cache N 318c and processor N 320c.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in data storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the data storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302a implements execution node 1 304a and execution node 2 304b on one computing platform at a geographic location and implements execution node N 304c at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in data storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
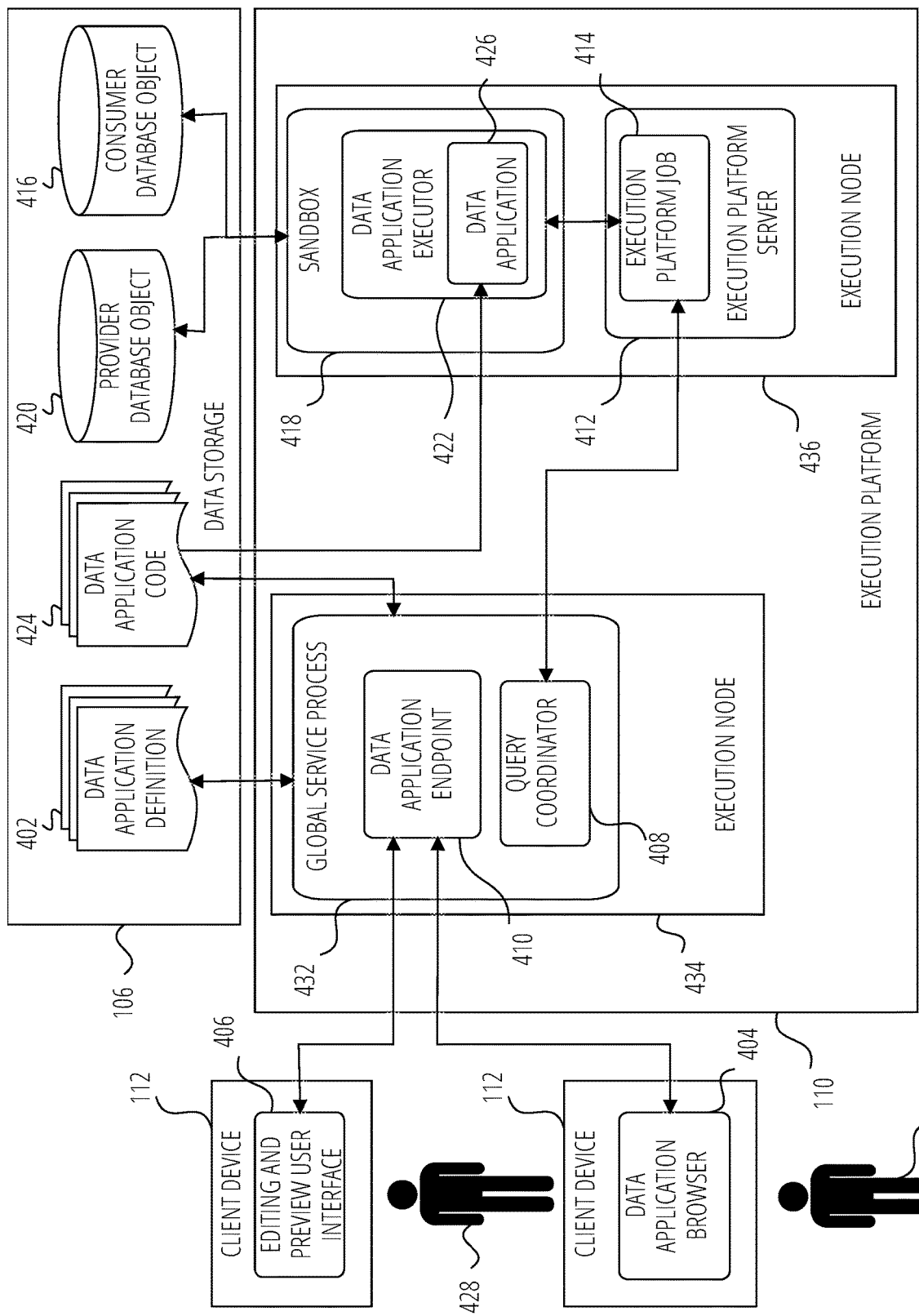
FIG. 4 is a deployment diagram of an execution environment of a data platform in accordance with some examples of the present disclosure.

FIG. 4 is a deployment diagram of an execution environment of a data platform 102 in accordance with some examples. The data platform 102 provides the execution environment to a provider 428 of data to provide a data application 426 for use by a consumer 430 of data. During execution of the data application 426, the data application 426 accesses data of a provider database object 420 and data of a consumer database object 416.

During creation of a data application 426, a provider 428 (first user) accesses the data platform 102. Access to the data platform 102 is authorized by an access manager 202 (of FIG. 2) of the data platform 102 (of FIG. 1) based on one or more provider access privileges of a set of account privileges 232 (of FIG. 2) stored on data storage device 206 (of FIG. 2). The provider 428 creates and edits data application code 424 of a data application 426 using an editing and preview user interface 406 hosted by a client device 112 connected to a global service process 432 that is a process that uses components of the compute service manager 104 (of FIG. 1) to broker requests to execution nodes of an execution platform 110 (of FIG. 1) and compiles queries submitted to the data platform 102. The global service process 432 executes in a global service process 432 running in an execution node 434 of the execution platform 110. The global service process 432 provides an editing and preview user interface 406 to the provider 428 that the provider 428 uses to enter the data application code 424. The provider 428 can make changes in the editing and preview user interface 406, and request to see the updates in a preview pane of the editing and preview user interface 406. The provider 428 can interact with the data application 426 directly in the preview pane. The data platform 102 stores the data application code 424 in data storage 106 of the data platform 102.

The data application 426 is written in a high-level language that is useful for database processing, such as Python or the like. In some examples, the data application 426 is written in a dialect of SQL. When executed, the data application 426 can create additional data applications and have them executed during a common session.

The data application 426 is executed by a data application executor 422 started by an execution platform job 414 that is a component of an execution platform server 412 that keeps some memory in state and runs in an execution node 436 of the execution platform 110 of the data platform 102.

The data application executor 422 runs in a sandbox 418 that enforces one or more security policies of the data platform 102. The compute service manager 104 manages a data application endpoint 410 implementing a computer communications protocol communication channels over a single network connection, such as a Web socket, and acts as a proxy for communicating commands through a query coordinator 408 to the data application executor 422 executing the data application 426.

The provider 428 shares the data application 426 to one or more consumers, such as consumer 430, with one or more roles and privileges specified in a set of provider granted privileges 230 (of FIG. 2). Enabling the consumer 430 to use the data application will give the consumer 430 a "usage" privilege in the data application 426. In some examples, enabling the consumer 430 to use the data application will also give the consumer 430 an "access" privilege to one or more provider database objects, such as provider database object 420. Enabling the consumer 430 to edit the provider database object 420 will give them "modify" privileges.

In some examples, when the provider 428 is interacting with the editing and preview user interface 406, the provider 428 will interact with endpoints of a data application editing process. The provider 428 using the editing and preview user interface 406 can create a data application, modify the data application, describe the data application, and delete the data application.

In some examples, the data application 426 can have a name, a unique identification, an owner role, secondary roles, a file path to the executable version of the data application code 424, and a source datastore of the source code of the data application code 424. The data application has an associated data application definition 402 storing metadata of the data application 426. The metadata includes a name that is a human readable name and appears in Uniform Resource Locators (URLs) used for accessing the data application 426.

In some examples, the data application definition 402 also includes an application identification that is a Universally Unique Identifier (UUID) that uniquely identifies the data application 426. The UUID is used in an immutable Uniform Resource Identifier (URI) used to access the data application 426 that will not change with data application 426 name changes.

The data application definition 402 includes a primary role and one or more secondary roles that are roles used to restrict the roles that a running data application can perform. The data application definition 402 includes the source datastore where the source code for the data application 426 is stored. The data application definition 402 also includes the file path to the main file of the data application 426. The data application definition 402 also includes an identification of an execution environment that determines how to run the data application.

The global service process 432 generates a URL and a URI that will be used to access the data application 426 by the consumer 430 based on the data application metadata in the data application definition 402. For example, a human readable URL that changes with renaming the data application 426 such as:

https://account_identifier.datacomputing.com/apps/
        <DB>/<Schema>/<AppName>.

The other endpoint is an immutable URI such as:

https://account_identifier.snowflakecomputing.com/
        <data application reference>/<AppID>

The URL and URI are included in the data application definition 402 so that the data platform 102 can respond to a query for the URL of a particular data application.

When the consumer 430 decides to acquire privileges to use the data application 426, such as by purchasing a license to use the data application 426 from a data application marketplace, the consumer 430 adds the URL or other identifier of the data application 426 to a database share of an account of the consumer 430 and grants the provider 428 one or more provider access to data privileges. The data platform 102 receives the one or more provider access to data privileges and includes them in the set of consumer granted privileges 228 (of FIG. 2). During execution the data application 426 will use the one or more provider access to data privileges to access one or more database objects of the consumer 430, such as consumer database object 416.

To use the data application 426 the consumer 430 uses a data application browser 404 to access the data application 426 using the URL or URI. Upon navigating to the URL, the data platform 102 authorizes the consumer 430 to access the data platform 102 itself based on a consumer account privilege included in a set of account privileges 232 maintained by the data platform. Upon a successful authentication, the global service process 432 communicates a token to the data application browser 404 that the data application browser 404 receives and uses to access the data application 426.

In some examples, the token is a cookie set in the data application browser 404, A client executing in the data application browser 404 requests establishment of a Web socket connection to the data platform 102. A Web socket connection upgrade protocol request carries the set cookie in a Hypertext Transfer Protocol (HTTP) request. The data platform 102 authorizes the user session associated with the cookie based on one or more consumer account privileges included in the set of account privileges 232 and if successful, returns a successful response to upgrade the HTTP connection to a Web socket session. The data platform 102 also attaches the session of the consumer 430 to the Web socket connection to evaluate the effective context used to process a data application request in a sandboxed execution environment provided by the sandbox 418.

Using the established Web socket session, the data application 426 sends requests to execute the data application code 424 associated with the data application data application executor 422. The access manager 202 of the data platform 102 evaluates an effective execution context based on the user session attached to the Web socket connection to execute the data application 426 in the sandboxed execution environment created by sandbox 418 where the data application 426 executes in the context of one or more provider account privileges associated with the provider 428 and included in the set of account privileges 232. The effective execution context uses a virtual warehouse configured for the consumer 430 in an account of the consumer 430 to execute the data application code 424 of the data application 426.

In response to receiving a request for access to the data application 426 communicated by the data application browser 404, the global service process 432 executes the data application 426 by creating an execution platform job 414 within an execution platform server 412 running on an execution node 436 of the execution platform 110. The data platform 102 then sends messages using the query coordinator 408 to the execution platform job 414. The execution platform job 414 pushes a run command for the data application 426 to the data application executor 422. The data application executor 422 receives the run command, loads the data application code 424 and executes the data application 426.

The data application executor 422 executes the data application 426 within the sandbox 418. The sandbox 418 controls which database objects of the data platform 102 that the data application 426 can access. The sandbox 418 does so by authorizing the data application to access the provider database object 420 based on the set of provider granted privileges 230 including one or more consumer access to data privileges authorizing the consumer 430 to access the provider database object 420 of provided by the provider 428. The sandbox 418 also authorizes the data application to access the consumer database object 416 based on the set of consumer granted privileges 228 including one or more provider access to data privileges authorizing the provider 428 to access the consumer database object 416 used by the consumer 430.

The data application 426 generates one or more results based on data obtained by accessing the provider database object 420 and the consumer database object 416. The data application 426 can store the results in the consumer database object 416. The sandbox 418 authorizes the storing of the one or more results to the consumer database object 416 based on the set of the set of consumer granted privileges 228. The data application 426 can also communicate the one or more results to the data application browser 404 used by the consumer 430. The global service process 432 using the access manager 202 authorizes the data application 426 to communicate the one or more results to the data application browser 404 based on the one or more consumer account privileges of the set of the account privileges 232 associated with the consumer 430.

In some examples, the sandbox 418 authorizes the data application 426 to access other components of the data platform 102 based on a set of security policies of the data platform to limit an ability of the data application 426 to execute malicious code.

In some examples, access manager 202 uses a Role-Based Access Control (RBAC) model to authorize access to the data platform 102 and the database objects and components of the data platform 102. Once the authentication is successful, the data platform 102 sets a cookie in the data application browser 404 specific to the data application's unique URI path. This enables different data applications to run in the same browser using different user contexts. The validity of the cookie is associated with the user's session policy defined in the data platform 102.

Figure 5:
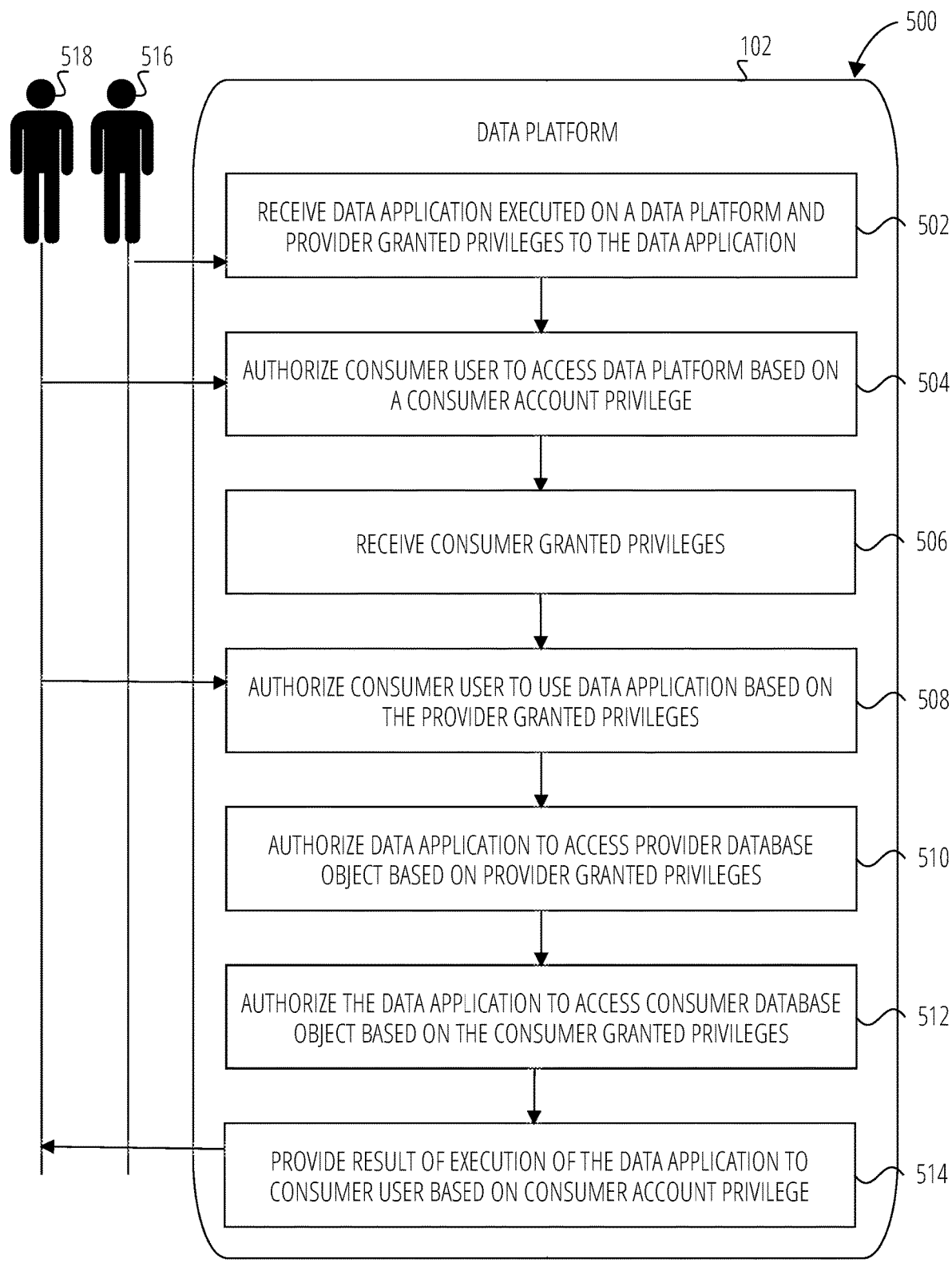
FIG. 5 is a process flow diagram illustrating a method of execution of a data application by a data platform in accordance with some examples of the present disclosure.

FIG. 5 is a process flow diagram illustrating a method 500 of execution of a data application 426 by a data platform 102 in accordance with some examples. The data platform 102 uses the method 500 when executing a data application 426 provided by a data provider and used by a data consumer.

In operation 502, the data platform 102 receives from a provider user 516 (first user), data application code 424 of a data application 426. In addition, the data platform 102 receives a set of provider granted privileges 230 including a consumer usage privilege authorizing a consumer user 518 (second user) to use the data application 426 and a consumer access to data privilege authorizing the consumer user 518 to access a provider database object 420 of the provider user 516 (first user).

In operation 504, the data platform 102 authorizes the consumer user 518 (second user) to access the data platform 102 based on a consumer account privilege included in account privileges 232 used by an access manager 202 to authorize access to the data platform 102 and to access database objects of the data platform 102.

In operation 506, the data platform 102 receives from the consumer user 518 (second user), a set of consumer granted privileges including a provider access to data privilege authorizing the provider user 516 (first user) to access a consumer database object of the consumer user 518 (second user).

In operation 508, the data platform 102 authorizes the consumer user 518 (second user) to use the data application 426 based on the consumer usage privilege of the provider granted privileges 230.

In operation 510, during an execution of the data application 426 by the data platform 102 in response to a request from the consumer user 518 (second user) to use the data application, the data platform 102 authorizes the data application 426 to access the provider database object 420 based on the consumer access to data privilege included in the provider granted privileges 230.

In operation 512, during the execution of the data application 426 by the data platform 102 in response to the request from the consumer user 518 (second user) to use the data application, the data platform 102 authorizes the data application 426 to access the consumer database object 416 based on the provider access to data privilege included in the consumer granted privileges 228.

In operation 514, the data platform 102 provides a result of the execution of the data application to the consumer user 518 (second user) based on the consumer account privilege.

Figure 6:
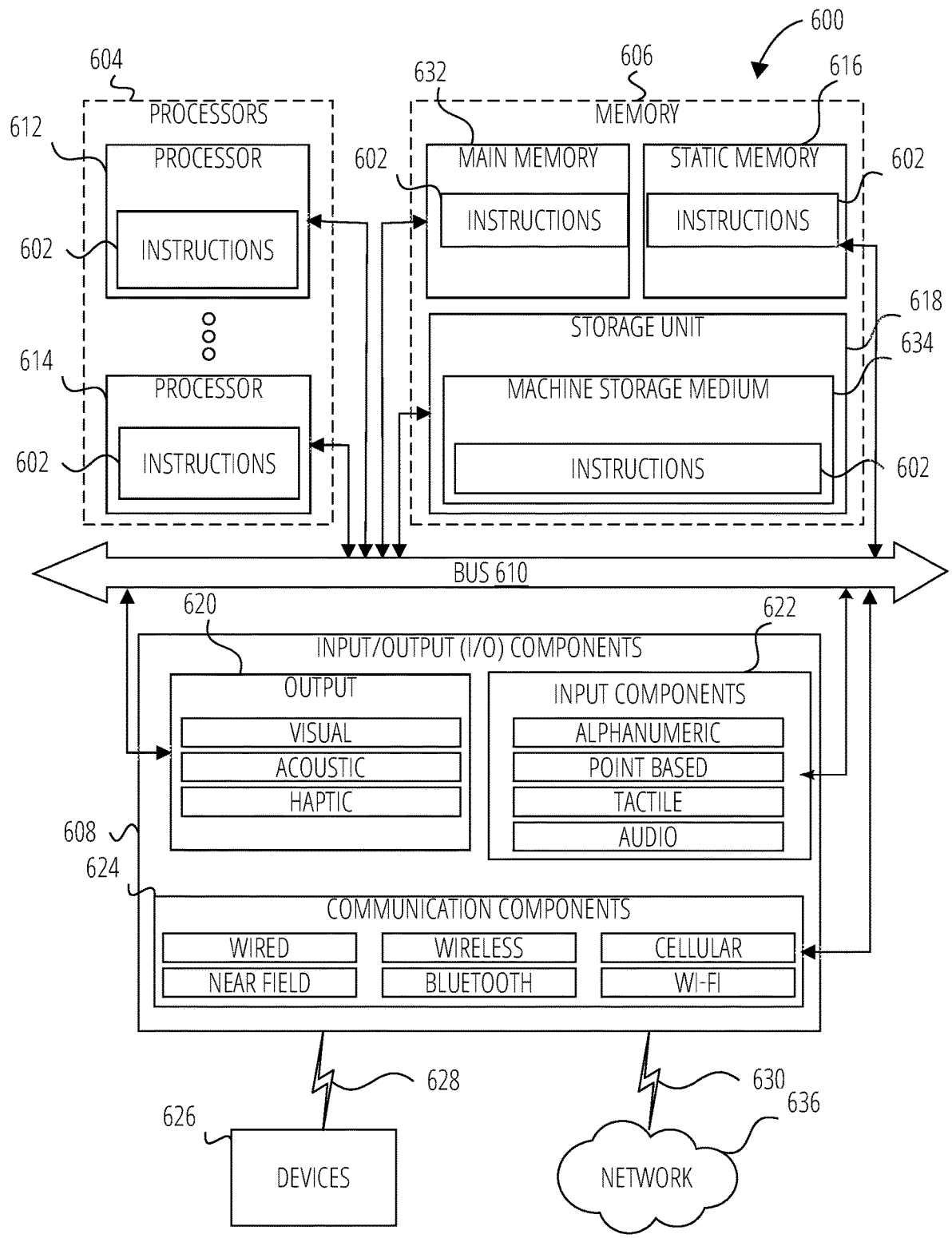
FIG. 6 illustrates a diagrammatic representation of a machine in the form of a computer system within which a set of instructions may be executed for causing the machine to perform any one or more of the methodologies discussed herein, in accordance with some examples of the present disclosure.

FIG. 6 illustrates a diagrammatic representation of a machine 600 in the form of a computer system within which a set of instructions may be executed for causing the machine 600 to perform any one or more of the methodologies discussed herein, according to examples. Specifically, FIG. 6 shows a diagrammatic representation of the machine 600 in the example form of a computer system, within which instructions 602 (e.g., software, a program, an application, an applet, a data application, or other executable code) for causing the machine 600 to perform any one or more of the methodologies discussed herein may be executed. For example, the instructions 602 may cause the machine 600 to execute any one or more operations of any one or more of the methods described herein. In this way, the instructions 602 transform a general, non-programmed machine into a particular machine 600 (e.g., the compute service manager 104, the execution platform 110, and the data storage devices 1 to N of data storage 106) that is specially configured to carry out any one of the described and illustrated functions in the manner described herein.

In alternative examples, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 602, sequentially or otherwise, that specify actions to be taken by the machine 600. Further, while only a single machine 600 is illustrated, the term "machine" shall also be taken to include a collection of machines that individually or jointly execute the instructions 602 to perform any one or more of the methodologies discussed herein.

The machine 600 includes processors 604, memory 606, and I/O components 608 configured to communicate with each other such as via a bus 610. In some examples, the processors 604 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 612 and a processor 614 that may execute the instructions 602. The term "processor" is intended to include multi-core processors that may comprise two or more independent processors (sometimes referred to as "cores") that may execute instructions 602 contemporaneously. Although FIG. 6 shows multiple processors 604, the machine 600 may include a single processor with a single core, a single processor with multiple cores (e.g., a multi-core processor), multiple processors with a single core, multiple processors with multiple cores, or any combination thereof.

The memory 606 may include a main memory 632, a static memory 616, and a storage unit 618 including a machine storage medium 634, all accessible to the processors 604 such as via the bus 610. The main memory 632, the static memory 616, and the storage unit 618 store the instructions 602 embodying any one or more of the methodologies or functions described herein. The instructions 602 may also reside, completely or partially, within the main memory 632, within the static memory 616, within the storage unit 618, within at least one of the processors 604 (e.g., within the processor's cache memory), or any suitable combination thereof, during execution thereof by the machine 600. As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media.

The input/output (I/O) components 608 include components to receive input, provide output, produce output, transmit information, exchange information, capture measurements, and so on. The specific I/O components 608 that are included in a particular machine 600 will depend on the type of machine. For example, portable machines such as mobile phones will likely include a touch input device or other such input mechanisms, while a headless server machine will likely not include such a touch input device. It will be appreciated that the I/O components 608 may include many other components that are not shown in FIG. 6. The I/O components 608 are grouped according to functionality merely for simplifying the following discussion and the grouping is in no way limiting. In various examples, the I/O components 608 may include output components 620 and input components 622. The output components 620 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 622 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 608 may include communication components 624 operable to couple the machine 600 to a network 636 or devices 626 via a coupling 630 and a coupling 628, respectively. For example, the communication components 624 may include a network interface component or another suitable device to interface with the network 636. In further examples, the communication components 624 may include wired communication components, wireless communication components, cellular communication components, and other communication components to provide communication via other modalities. The devices 626 may be another machine or any of a wide variety of peripheral devices (e.g., a peripheral device coupled via a universal serial bus (USB)). For example, as noted above, the machine 600 may correspond to any one of the compute service manager 104, the execution platform 110, and the devices 626 may include the data storage device 226 or any other computing device described herein as being in communication with the data platform 102 or the data storage 106.

The various memories (e.g., 606, 616, 632, and/or memory of the processor(s) 604 and/or the storage unit 618) may store one or more sets of instructions 602 and data structures (e.g., software) embodying or utilized by any one or more of the methodologies or functions described herein. These instructions 602, when executed by the processor(s) 604, cause various operations to implement the disclosed examples.

In various examples, one or more portions of the network 636 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 636 or a portion of the network 636 may include a wireless or cellular network, and the coupling 630 may be a Code Division Multiple Access (CDMA) connection, a Global System for Mobile communications (GSM) connection, or another type of cellular or wireless coupling. In this example, the coupling 630 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 602 may be transmitted or received over the network 636 using a transmission medium via a network interface device (e.g., a network interface component included in the communication components 624) and utilizing any one of a number of well-known transfer protocols (e.g., hypertext transfer protocol (HTTP)). Similarly, the instructions 602 may be transmitted or received using a transmission medium via the coupling 628 (e.g., a peer-to-peer coupling) to the devices 626. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 602 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

The following, non-limiting examples, detail certain aspects of the present subject matter to solve the challenges and provide the benefits discussed herein, among others.

Example 1, a computer-implemented method of a data platform, the method includes receiving, by the data platform from a first user, a data application to be executed on the data platform and provider granted privileges for the data application, the provider granted privileges including a consumer usage privilege authorizing a second user to use the data application and a consumer access to data privilege authorizing the second user to access a provider database object of the first user. The computer-implemented method further includes authorizing, by the data platform, the second user to access the data platform based on a consumer account privilege. The computer-implemented method further includes receiving, by the data platform from the second user, consumer granted privileges, the consumer granted privileges including a provider access to data privilege authorizing the first user to access a consumer database object of the second user. The computer-implemented method further includes authorizing, by the data platform, the second user to use the data application based on the consumer usage privilege of the provider granted privileges. The computer-implemented method further includes during an execution of the data application by the data platform in response to a request from the second user to use the data application, performing operations includes authorizing the data application to access the provider database object based on the consumer access to data privilege included in the provider granted privileges, and authorizing the data application to access the consumer database object based on the provider access to data privilege included in the consumer granted privileges.

In Example 2, the subject matter of Example 1, wherein the data application includes an application identification having a Universally Unique Identifier (UUID) that uniquely identifies the data application and does not change with a change in a name of the data application.

In Example 3, the subject matter of any of Example 1 and Example 2, wherein the data application includes one or more roles used to restrict the roles that a running data application can perform.

In Example 4, the subject matter of any of Example 1 to Example 3, wherein the data application includes an identification of an execution environment that determines how to run the data application.

In Example 5, the subject matter of any of Example 1 to Example 4, wherein the data platform receives from the second user the consumer granted privileges when the second user purchases the consumer usage privilege to the data application.

In Example 6, the subject matter of any of Example 1 to Example 5, wherein authorizing, by the data platform, the second user to use the data application further includes establishing a Web socket connection by a data application browser to the data platform based on the consumer account privileges.

In Example 7, the subject matter of any of Example 1 to Example 6, wherein authorizing, by the data platform, the second user to use the data application further includes attaching a session of the second user to the Web socket connection to evaluate a context used to process a request to use the data application in a sandboxed execution environment.

In Example 8, the subject matter of any of Example 1 to Example 7, wherein the execution of the data application by the data platform in response to the request from the second user further includes executing the data application in the sandboxed execution environment where the data application executes in the context of one or more provider account privileges associated with the first user.

In Example 9, the subject matter of any of Example 1 to Example 8, wherein executing the data application in the sandboxed execution environment further includes generating one or more results based on data obtained by accessing the provider database object and the consumer database object, and authorizing storing of the one or more results to the consumer database object based on the set of consumer granted privileges.

In Example 10, the subject matter of any of Example 1 to Example 9, wherein executing the data application in the sandboxed execution environment further includes authorizing communication of the one or more results to the data application browser used by the second user to access the data platform, the authorizing based on the one or more consumer account privileges associated with the second user.

In Example 11, a machine comprising means to implement of any of Examples 1-10.

In Example 12, a system to implement of any of Examples 1-10.

In Example 13, a machine storage medium storing instructions that, when executed by a machine, cause the machine to implement any of Examples 1-10.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A computer-implemented method comprising:
   receiving, by a data platform, from a consumer user, a request to use a data application of the data platform, the data application provided by a provider user of the data platform, the data application imported into a consumer account of the consumer user and executed on the data platform;
   executing, by the data platform, the data application imported into the consumer account;
   authorizing, by the data platform, the data application to access and edit a provider database object provided by the provider user based on a consumer access to data privilege and a consumer modify privilege granted by the provider user to the consumer user;
   authorizing, by the data platform, the data application to access and store data to a consumer database object provided by the consumer user based on a provider access to data privilege granted by the consumer user to the provider user;
   generating, by the data application, results using the consumer database object and the provider database object; and
   storing, by the data application, the results into the consumer database object.

2. The computer-implemented method of claim 1, wherein the data application includes an application identification having a Universally Unique Identifier (UUID) that uniquely identifies the data application and does not change with a change in a name of the data application.

3. The computer-implemented method of claim 1, wherein the data application includes one or more roles used to restrict the roles that a running data application can perform.

4. The computer-implemented method of claim 1, wherein the data application includes an identification of an execution environment that determines how to run the data application.

5. The computer-implemented method of claim 1, wherein the data platform receives from the consumer user the consumer granted privileges when the consumer user purchases a consumer usage privilege to the data application.

6. The computer-implemented method of claim 1, wherein authorizing, by the data platform, the consumer user to use the data application further comprises:
   establishing a Web socket connection by a data application browser to the data platform based on consumer account privileges of the consumer user.

7. The computer-implemented method of claim 6, wherein authorizing, by the data platform, the consumer user to use the data application further comprises:
   attaching a session of the consumer user to the Web socket connection to evaluate a context used to process a request to use the data application in a sandboxed execution environment.

8. The computer-implemented method of claim 7, wherein the execution of the data application by the data platform in response to the request from the consumer user further comprises:
   executing the data application in the sandboxed execution environment wherein the data application executes in the context of one or more provider account privileges associated with the provider user.

9. The computer-implemented method of claim 8, wherein executing the data application in the sandboxed execution environment further comprises:
   generating one or more results based on data obtained by accessing the provider database object and the consumer database object; and
   authorizing storing of the one or more results to the consumer database object based on the consumer granted privileges.

10. The computer-implemented method of claim 9, wherein executing the data application in the sandboxed execution environment further comprises:
    authorizing communication of the one or more results to the data application browser used by the consumer user to access the data platform, the authorizing based on the consumer account privileges associated with the consumer user.

11. A data platform comprising:
    one or more processors; and
    at least one memory storing instructions that, when executed by the one or more processors, cause the data platform to perform operations comprising:
    receiving, from a consumer user, a request to use a data application of the data platform, the data application provided by a provider user of the data platform, the data application imported into a consumer account of the consumer user and executed on the data platform;
    authorizing, by the data platform, the data application to access and edit a provider database object provided by the provider user based on a consumer access to data privilege and a consumer modify privilege granted by the provider user to the consumer user;
    authorizing, by the data platform, the data application to access and store data to a consumer database object provided by the consumer user based on a provider access to data privilege granted by the consumer user to the provider user; and
    executing, by the data platform, the data application imported into the user account, the data application performing operations comprising:

generating results using the consumer database object and the provider database object; and storing the results into the consumer database object.

12. The data platform of claim 11, wherein the data application includes an application identification having a Universally Unique Identifier (UUID) that uniquely identifies the data application and does not change with a change in a name of the data application.

13. The data platform of claim 11, wherein the data application includes one or more roles used to restrict the roles that a running data application can perform.

14. The data platform of claim 11, wherein the data application includes an identification of an execution environment that determines how to run the data application.

15. The data platform of claim 11, wherein the data platform receives from the consumer user the consumer granted privileges when the consumer user purchases a consumer usage privilege to the data application.

16. The data platform of claim 11, wherein authorizing, by the data platform, the consumer user to use the data application further comprises:

establishing a Web socket connection by a data application browser to the data platform based on consumer account privileges of the consumer user.

17. The data platform of claim 16, wherein authorizing, by the data platform, the provider user to use the data application further comprises:

attaching a session of the consumer user to the Web socket connection to evaluate a context used to process a request to use the data application in a sandboxed execution environment.

18. The data platform of claim 17, wherein the execution of the data application by the data platform in response to the request from the consumer user further comprises:

executing the data application in the sandboxed execution environment wherein the data application executes in the context of one or more provider account privileges associated with the provider user.

19. The data platform of claim 18, wherein executing the data application in the sandboxed execution environment further comprises:

generating one or more results based on data obtained by accessing the provider database object and the consumer database object; and authorizing storing of the one or more results to the consumer database object based on the consumer granted privileges.

20. The data platform of claim 19, wherein executing the data application in the sandboxed execution environment further comprises:

authorizing communication of the one or more results to the data application browser used by the consumer user to access the data platform, the authorizing based on the consumer account privileges associated with the consumer user.

21. A computer-storage medium comprising instructions that, when executed by one or more processors of a data platform, cause the data platform to perform operations comprising:

receiving, from a consumer user, a request to use a data application of the data platform, the data application provided by a provider user of the data platform, the data application imported into a consumer account of the consumer user and executed on the data platform;

authorizing, by the data platform, the data application to access and edit a provider database object provided by the provider user based on a consumer access to data privilege and a consumer modify privilege granted by the provider user to the consumer user;

authorizing, by the data platform, the data application to access and store data to a consumer database object provided by the consumer user based on a provider access to data privilege granted by the consumer user to the provider user; and executing, by the data platform, the data application imported into the user account, the data application performing operations comprising:

generating results using the consumer database object and the provider database object; and storing the results into the consumer database object.

22. The computer-storage medium of claim 21, wherein the data application includes an application identification having a Universally Unique Identifier (UUID) that uniquely identifies the data application and does not change with a change in a name of the data application.

23. The computer-storage medium of claim 21, wherein the data application includes one or more roles used to restrict the roles that a running data application can perform.

24. The computer-storage medium of claim 21, wherein the data application includes an identification of an execution environment that determines how to run the data application.

25. The computer-storage medium of claim 21, wherein the data platform receives from the consumer user the consumer granted privileges when the consumer user purchases a consumer usage privilege to the data application.

26. The computer-storage medium of claim 21, wherein authorizing, by the data platform, the consumer user to use the data application further comprises:

establishing a Web socket connection by a data application browser to the data platform based on consumer account privileges of the consumer user.

27. The computer-storage medium of claim 26, wherein authorizing, by the data platform, the consumer user to use the data application further comprises:

attaching a session of the provider user to the Web socket connection to evaluate a context used to process a request to use the data application in a sandboxed execution environment.

28. The computer-storage medium of claim 27, wherein the execution of the data application by the data platform in response to the request from the provider user further comprises:

executing the data application in the sandboxed execution environment wherein the data application executes in the context of one or more provider account privileges associated with the provider user.

29. The computer-storage medium of claim 28, wherein executing the data application in the sandboxed execution environment further comprises:

generating one or more results based on data obtained by accessing the provider database object and the consumer database object; and authorizing storing of the one or more results to the consumer database object based on the consumer granted privileges.

30. The computer-storage medium of claim 29, wherein executing the data application in the sandboxed execution environment further comprises:

authorizing communication of the one or more results to the data application browser used by the consumer user to access the data platform, the authorizing based on the consumer account privileges associated with the consumer user.

* * * * *